(No Model.)
J. T. CASE.
SHAFT HANGER AND ENGINE CASE.
No. 421,856. Patented Feb. 18, 1890.
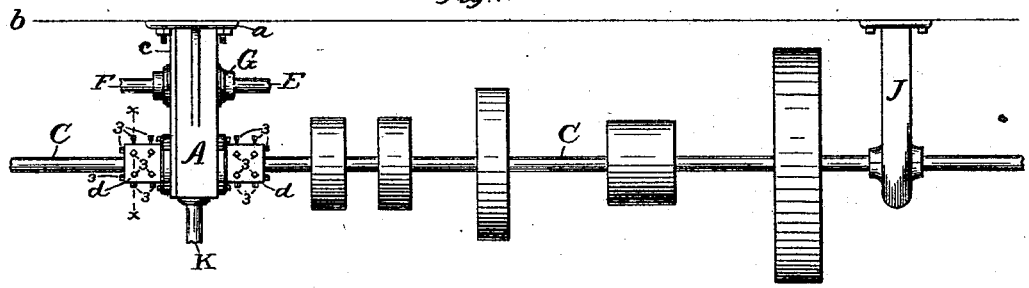
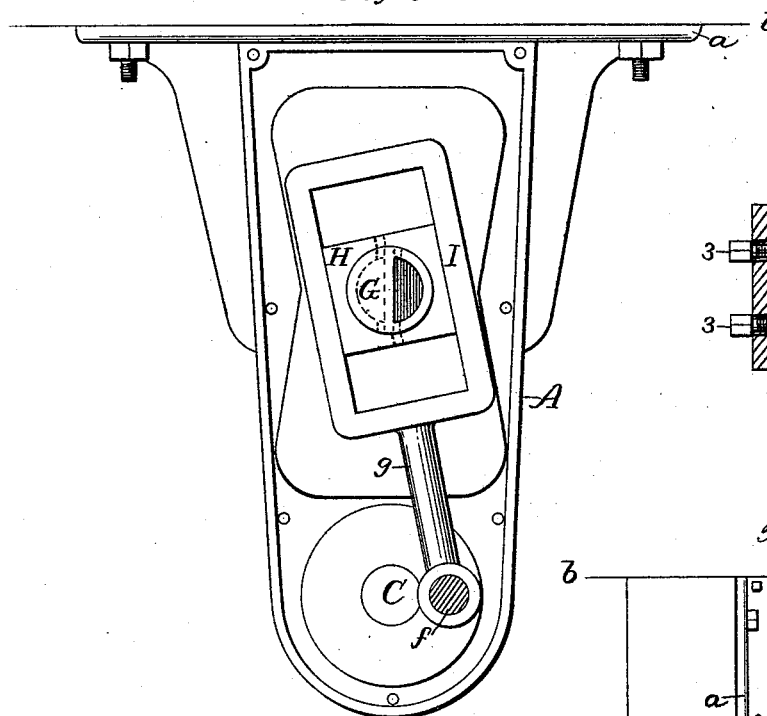
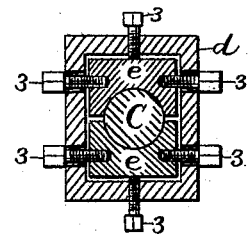
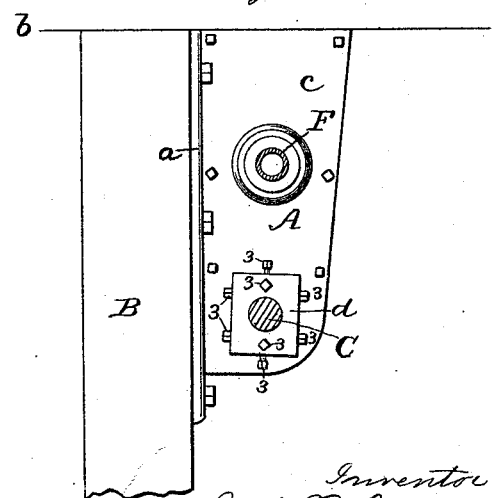
Witnesses:
John Edwards Jr.
E. Dwight Gannon
Inventor,
Joel T. Case.
By James Shepard
Atty.

UNITED STATES PATENT OFFICE.

JOEL T. CASE, OF BRISTOL, CONNECTICUT.

SHAFT-HANGER AND ENGINE-CASE.

SPECIFICATION forming part of Letters Patent No. 421,856, dated February 18, 1890.

Original application filed June 13, 1887, Serial No. 241,094. Divided and this application filed November 7, 1887. Serial No. 254,458. (No model.)

*To all whom it may concern:*

Be it known that I, JOEL T. CASE, a citizen of the United States, residing at Bristol, in the county of Hartford and State of Connecticut, have invented certain new and useful Improvements in Shaft-Hangers and Engine-Cases, of which the following is a specification.

My invention relates to improvements in shaft-hangers and engine-cases; and the object of my improvement is to so construct the engine-case that it may serve the double purpose of forming the frame of the engine and one of the hangers for a line of overhead shafting.

In the accompanying drawings, Figure 1 is a side elevation of a line of overhead shafting with my engine-case serving as one of the hangers therefor. Fig. 2 is a front elevation, partly in section, of my shaft-hanger and engine-case, with one of the broad sides removed to show the inclosed parts of the engine. Fig. 3 is a transverse section of the shaft-hanger bearings on line $x$ $x$ of Fig. 1, and Fig. 4 is a front elevation of my shaft-hanger and engine-case provided with flanges for securing it to an upright post or wall instead of to the ceiling.

This application is intended as a substitute for the matter severed from my application, Serial No. 241,094, filed June 13, 1887, by the erasure of the first claim.

The case or frame A is made of a flat thin form and provided with a flange $a$, by which it may be secured to the ceiling or other overhead support represented by the line $b$, as shown in Figs. 1 and 2, or to an upright post or support B, as shown in Fig. 4. For convenience of assembling the parts of the engine, I make one broad side of the case in the form of a detachable cap $c$, said cap being removed in the illustration shown in Fig. 2. At the lower part of the case A, on one or both sides, I arrange shaft-bearings $d$, within which bearings are adjustable boxes $e$, Fig. 3. These bearings are designed for receiving the shaft C, which forms part of a line of overhead shafting of indefinite length. The boxes in these bearings are adjusted for taking up wear or for bringing the shaft into proper position by means of the several adjusting-screws 3. Within the case of the engine, and connected with the shafting C, I arrange a crank-pin or eccentric $f$, Fig. 2, to which crank-pin the connection $g$ of the engine is attached.

Any engine which is compact enough to be received within the thin casing A, and which will not give too much motion to the case when placed overhead, may be used within my case; but I prefer to use that form of engine which is shown, described, and claimed in my application before referred to. It will therefore be unnecessary to describe the same herein except by a brief reference to the parts.

E designates the steam-inlet pipe; F, the exhaust-pipe; G, the hollow axle, divided longitudinally and provided with radial ports, as indicated by broken lines in Fig. 2; H, the rocking block or piston having a port at each end that registers with the ports in the hollow axle, and I the reciprocating and oscillating steam-box within which the piston H is fitted. The sides of the case serve to cover the sides of the steam-box and piston.

I have shown my hanger and case as provided with a shaft-bearing and boxes upon each side, which is the preferred form, and which will be used when the line of shafting extends in both directions from my hanger and case; but sometimes it may be desirable to have the line of shafting C extend only in one direction, or, in other words, have the hanger and case A at the end of the line, in which case I should apply the bearings $d$ only to one side. J designates another hanger for the line of shafting C, which hanger is of ordinary construction. My hanger may be used in connection with such ordinary hangers with only one engine on the line; or, if desired, one of my hangers and engine-cases may be substituted for any or all of the ordinary hangers, so that power may be applied to different points along the line of the shafting, thereby extending the shafting as long as may be desired, and relieving it of much of the torsional strain that would exist if the power were applied all at one point. If desired, when the flange $a$ is bolted to an overhead support, an upright K may be placed in under the hanger and case, as illustrated in Fig. 1, and extended downward to any firm base or support.

I am aware that prior patents show engines with box-like cases having a base-flange, which cases inclose all the parts except the shaft that projects from one or both sides through bearings having no provision for adjusting the shaft therein transversely to its axis, and without any special adaptation for or suggestion of using said cases for a shaft-hanger, and such engines are hereby disclaimed.

I claim as my invention—

1. The herein-described hanger and engine-case made of a flat thin form and provided with a flange for securing it in position, the said hanger and case having a shaft-bearing and devices for adjusting said bearing transversely to the shafting, substantially as described, and for the purpose specified.

2. The combination of the herein-described hanger and engine-case made of a flat thin form and provided with the flange $a$ for securing it in position, a hanger separate from said case, as at J, with its bearing in alignment with the shaft-bearing of said case, and the shafting supported in part by each of said hangers, substantially as described, and for the purpose specified.

JOEL T. CASE.

Witnesses:
JAMES SHEPARD,
JOHN EDWARDS, Jr.